United States Patent [19]

Fuss et al.

[11] Patent Number: 4,558,882
[45] Date of Patent: Dec. 17, 1985

[54] SEEDER CART ATTACHMENT TO AGRICULTURAL IMPLEMENTS

[76] Inventors: Albert K. Fuss, 1 Jellicoe St.; Eric W. Fuss, 3 Heller St.; Jarvis R. Fuss, 143 Tourist Rd.; Roy M. Fuss, 21 Leslie St., all of Toowoomba, Queensland 4350, Australia

[21] Appl. No.: 539,667

[22] Filed: Oct. 6, 1983

[30] Foreign Application Priority Data

Oct. 8, 1982 [AU] Australia ................. PF6258

[51] Int. Cl.[4] .................. B60D 7/02; A01B 73/00
[52] U.S. Cl. .................. 280/476 A; 111/55; 172/311; 172/679; 280/411 R
[58] Field of Search .......... 280/476 A, 411 R, 411 A, 280/411 B, 411 C; 111/52, 53, 54, 55, 58; 172/250, 253, 310, 311, 677, 679; 222/609, 610

[56] References Cited

U.S. PATENT DOCUMENTS

| | | | |
|---|---|---|---|
| 1,325,580 | 12/1919 | Reiter | 111/58 X |
| 1,832,946 | 11/1931 | Robinson | 111/52 X |
| 2,973,818 | 3/1961 | Marvin | 280/476 A X |
| 3,302,956 | 2/1967 | Sosalla | 172/311 X |
| 3,539,016 | 11/1970 | Bauer et al. | 172/311 |
| 3,606,848 | 9/1971 | Dobbs et al. | 172/311 X |
| 3,654,999 | 4/1972 | Fischer | 172/311 |
| 4,113,273 | 9/1978 | Gates | 172/311 X |
| 4,126,187 | 11/1978 | Schreiner et al. | 172/311 |
| 4,232,876 | 11/1980 | Burres | 280/411 C X |

Primary Examiner—Joseph F. Peters, Jr.
Assistant Examiner—Charles R. Watts
Attorney, Agent, or Firm—Wm. T. Wofford; James C. Fails; Arthur F. Zobal

[57] ABSTRACT

A seeder cart having draft apparatus and caster wheels arranged to be coupled between draft bars of an agricultural implement, the seeder cart carrying seed and/or fertilizer bins and a metering arrangement to feed the seed and/or fertilizer to distributor points on the implement characterized by a pull head on the seeder cart having withdrawable pins on the pull head allowing the implement to be detached from the draft bar of the seeder cart, the pull head having a universal coupling device between it and the draft apparatus of the seeder cart and the seeder cart having limited movement stabilizer apparatus connecting its rear portion to the draft bars of the implement.

8 Claims, 3 Drawing Figures

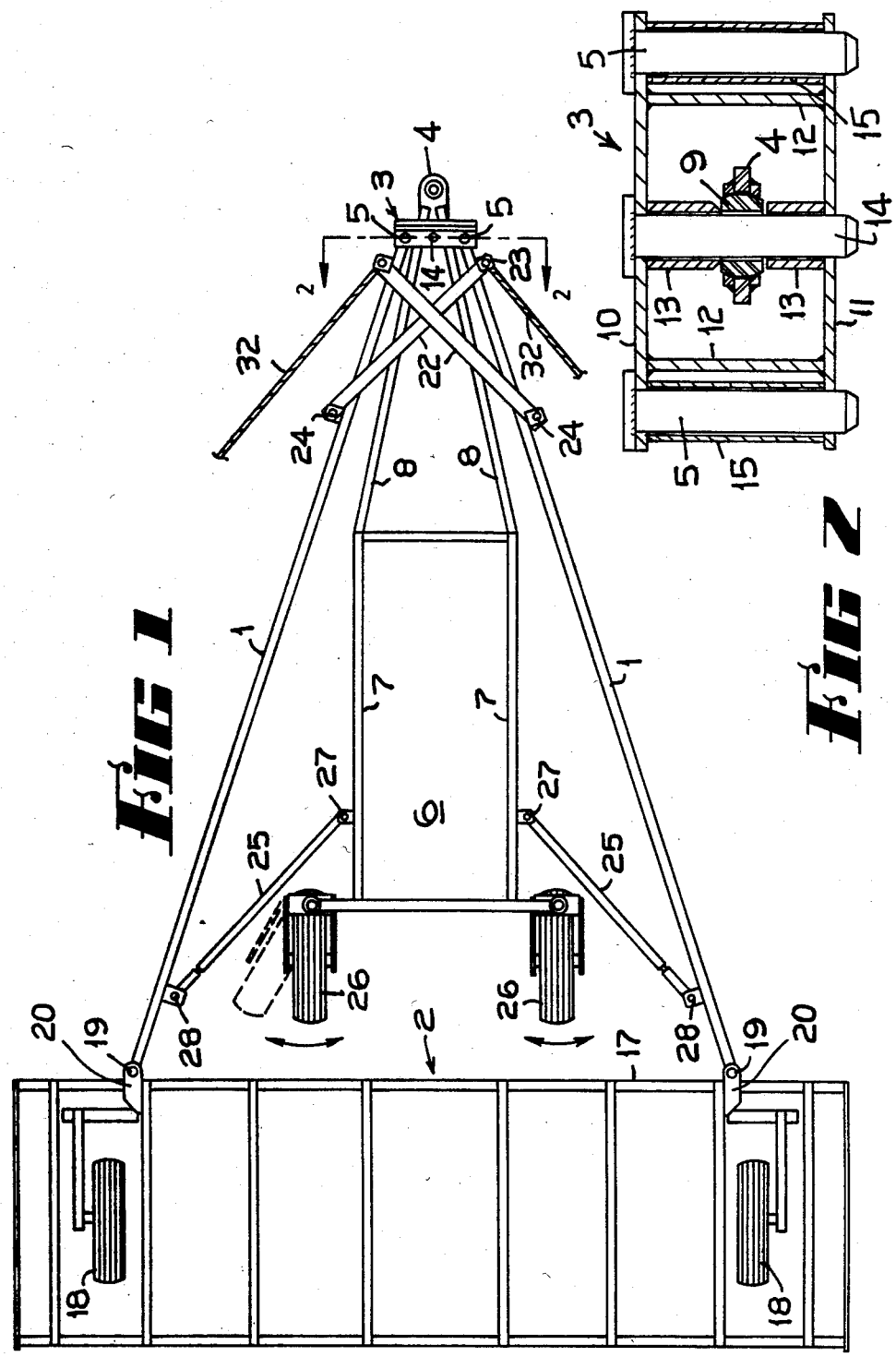

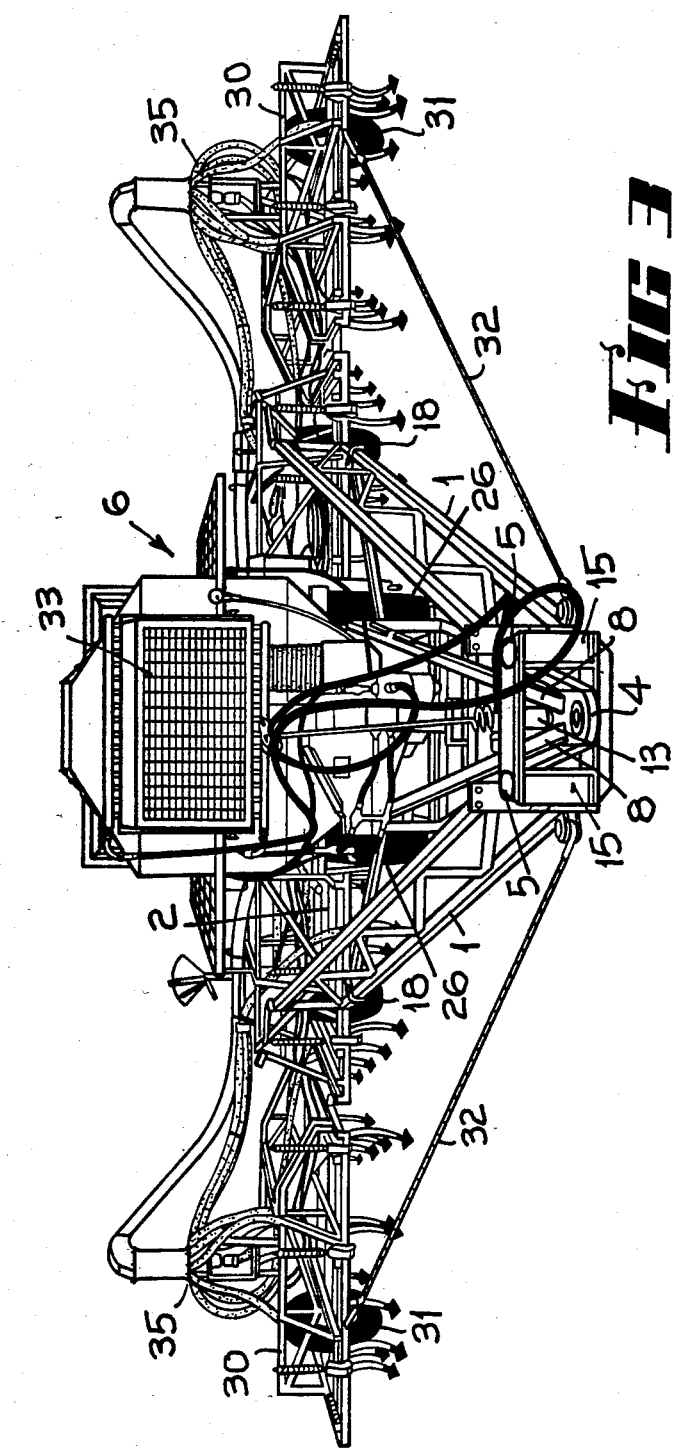

SEEDER CART ATTACHMENT TO AGRICULTURAL IMPLEMENTS

FIELD OF THE INVENTION

This invention relates to seeder cart attachment means to agricultural implements of the general type known as air seeders and in particular it relates to an attachment of the type in which a seeder cart is disposed between the draft frames of the implement but to be removable therefrom for recharging of the bins of the cart, yet to allow the seeder cart to operate in proximity to the argicultural implement when in position.

THE PRIOR ART

Various types of attachment are already known, and for instance in our own Australian Letters Patent No. 443,699 a draft attachment was provided in which a pair of rigid draft bars extended from spaced points on the agricultural implement to converge to a draft point which also served as means to pull the seeder cart when positioned between the draft bars, the draft bars being removable to allow the cart to be positioned or removed between them.

According to another patent of ours Australian Letters Patent No. 521,583, the cart was again positioned between draft bars of the implement but the draft bars were attached to the cart and the cart was attached to the tractor or other draft means with the draft bars articulated to allow them to be readily swung out when the cart was to be positioned. In this case the articulated draft bars were lockable to form a rigid triangulated assembly, each draft bar joining to the cart in such a manner that a rigid attachment between the implement and the cart existed and the alignment was maintained by the triangulated construction and rigid draft bars, the ground wheels of the cart being castered so that the wheels could take up the necessary angular position during turning of the implement.

OBJECTIVES AND SUMMARY OF THE INVENTION

An object of the present invention is to provide an improved system whereby a cart can again be positioned between hinged draft bars, which are of rigid construction, but are disengageable from a draft arrangement to permit positioning of the cart, the invention providing an improved arrangement which allows better stabilization of the cart and the implement in relation to each other and facilitates removal of the cart when required and replacement after the bins have been recharged.

The invention relates to seeder cart attachment to agricultural implements, such as tillage implements, in which a seeder cart has rear caster wheels and a forward draft member adapted to be engaged on traction means and supports at least a bin for seed and/or fertiliser and means to discharge the seed and/or fertiliser to the agricultural tillage implement, characterised by a pull head connected to the draft member by universal pivot means whereby the pull head can swivel on the draft member but has pull on the draft member transmitted thereto, and withdrawable pins on the pull head adapted to engage draft bars projecting forwardly from the agricultural implement whereby to pull the implement from the pull head, further characterised by stabilizer means connected between a rearward portion of the cart and the draft bars, the stabilizer bars and the universal pivot means being adapted to allow limited universal movement of the cart in relation to the agricultural implement while maintaining the cart between the draft bars in a general axial alignment.

According to a specific form of the invention a pull head is adapted to be connected to the draft member, a central connecting pin being carried on the pull head and a pair of coupling pins on the pull head being spaced from the central pin with one pin on each side to engage the forward ends of draft bars projecting forwardly from the agricultural implement and at least one being withdrawable to release the draft bar engaged by it, universal pivot means on the pull head engaging the central connecting pin to couple the pull head to the draft bars, and stabilizer means being connected between the draft bars and the rearward portion of the seeder cart to limit movement of the seeder cart between the draft bars.

DESCRIPTION OF THE DRAWINGS

FIG. 1 is a schematic plan of a frame of an agricultural implement coupled to the frame of a seeder cart, FIG. 2 is an enlarged transverse section on line 2—2 of FIG. 1 showing the pull head, and FIG. 3 is a perspective view from the front of an implement and seeder cart in their working position, showing also the air seeder means connected between the cart and implement.

DESCRIPTION OF THE PREFERRED EMBODIMENT

According to the form illustrated a pair of draft bars 1 are attached one at one side of the implement 2 and the other at the other side so that they are in spaced relationship at the implement but converge forwardly to a pull head 3 which has connected to it a draft member 4 adapted to engage the draw bar of a tractor or the like, and these draft bars 1 are coupled to the pull head 3 by a pair of coupling pins 5 positioned outwardly from the centre of the pull head so that by withdrawing one or other of these pins 5 the draft bars 1 can be separately manipulated in angle to allow them to be moved out of the position which they normally hold when in transport, thereby to permit the cart to be placed into position between the draft bars 1 or removed when required.

The cart 6 itself has a frame 7 which also has draft members 8 extending forwardly between the draft bars 1 of the implement, and these draft members 8 engage the draft member 4 which is located centrally on the pull head 3 through universal pivot means such as a ball pivot 9 so that the cart can tilt in any direction without the implement restraining such movement.

The pull head comprises upper and lower frame members 10 and 11 and spacers 12 secured thereto, and the members 10 and 11 are apertured at the ends to receive the coupling pins 5. The upper and lower frame members 10 and 11 each support a central hollow spacer 13 to position the ball pivot 9 centrally therebetween, and apertures in the central part of the frame members 10 and 11 allow the connecting pin 14, which serves to connect the pull head 3 to the cart 6, to be positioned.

In the form shown the draft bars 1 are in girder form as shown in FIG. 3 to provide a stable support between the pull head 3 and the forward frame bar 17 of the implement 2 so that the implement 2 can be supported on ground wheels 18 arranged along a transverse axial line, but if the implement is supported on forward and rearward wheels the draft bars can be single bars.

The draft bars 1 have at their forward ends socket members 15 which are the members which engage the coupling pins 5.

The draft bars have holding pins 19 engaging brackets 20 on the frame bar 17, allowing either one or both draft bars 1 to be swung outwardly when one or both of the coupling pins 5 are withdrawn, to thereby allow the cart to be positioned or removed.

The implement can be drawn by the draft bars 1 when a cart 6 is not in position by using a pair of pull stabilizers 22 connected angularly between the forward parts of the draft bars, one of the said pull stabilizers connecting to one draft bar 1 near its attachment to the pull head 3, or at that attachment, and at its other end connects to the other draft bar 1 some distance back from the attachment point of that draft bar 1 to the pull head 3 so that the two pull stabilizers cross and provide a rigid relationship of the pull head to the implement. Connection is by pins 23 and 24 between the ends of the pull stabilizers 22 and the draft bars 1.

When the seeder cart is in position however these pull stabilizers 22 are not used but movement limiting stabilizer bars 25, having limited extension, are connected between the frame 7 of the cart 6 and the draft bars 1 of the implement in such a manner that the cart is maintained in a generally central position between the implement draft bars 1, the wheels 26 of the cart 6 being caster wheels as in our earlier Australian Letters Patent No. 521,583 so that the wheels of the cart 6 can maintain correct alignment in relation to the direction of movement of the implement. The telescopic stabilizer means are coupled at their forward end by pins 27 to the frame 7 of the cart 6 and at the trailing ends by pins 28 to the draft bars 1.

The pull head thus comprises, in the preferred form shown, an upper frame member 10 and lower frame member 11 with fixing spacers 12 therebetween and carrying a central connecting pin 14 which engages the ball pivot 9 of the cart 6, the outer ends of the plates carrying a pair of coupling pins 5 to engage the draft bars 1 of the implements one on each side of the central pin. The stabilizer bars 25 can be telescopic bars with limited extension and could include centering springs.

In this way the implement 2 can readily be drawn by the pull head 3 whether or not the cart is positioned between the draft bars 1, and by withdrawing the coupling pins 5 the draft bars 1 can be disconnected from the pull head 3 to allow the draft bars 1 to be swung outwardly, thus again allowing a cart 6 to be readily positioned at the forward part of the implement between the implement draft bars 1 and allowing the cart 6 to move readily in relation to the ground about the ball pivot 9. Thus the cart is maintained in a central relationship between the implement draft bars 1, but some movement is allowed by the telescopic stabilizer bars 25 by having these projecting rearwardly from the frame 7 of the cart 6 at an angle to engage pivot pins 28 on the draft bars, thus allowing rise and fall as well as tilting between the cart and the implement. The telescopic action is arranged to be sufficient for the required movement but to prevent the cart 6 from moving too close to the draft bars 1.

It will be realised that the actual construction of the pull head can be varied but generally the construction will be such that a central connecting pin 14 can engage a ball pivot 9 and the pull head 3 while two outer coupling pins 5 will engage the forward ends of the implement draft bars 1 so that these draft bars 1 are spaced apart at the pull head 3 to allow the draft members 8 of the cart to be attached between the draft bars 1 of the implement 2.

It will be realised that the pull head 3 is connected to the draft member 4 by the universal ball pivot 9 so that it can swivel on the draft member but transmits pull to the implement 2, the withdrawable coupling pins 5 allowing the draft bars 1 to be released from the pull head 3, the stabilizer bars 25 between the cart 6 and the draft bars 1 allowing limited movement of the rear of the cart 6 in any direction because of the use of the universal ball pivot 9 but restraining the rear part of the cart 6 from fouling the draft bars 1 during turning. The cart 6 remains in a general axial alignment with the tillage implement 2 but being capable of rise and fall and of rotational movement about the cart axis.

As shown in FIG. 3, the main frame of the implement 2, can have side frames 30 hinged to the outer ends of the main frame to give an articulated construction and having wheels 31 in known manner, secondary draft members 32 then transmitting pull from the forward ends of the draft bars 1 to the outer ends of the side frames 30. The triangles formed between the draft bars 1 and secondary draft members 32 serve to add stability to the implement.

The seeder feed and quality control mechanism can be carried by the cart as well as the bins 33 and is coupled by hoses 34 to secondary distributors 35 and then discharge is through air hoses to the ground.

We claim:

1. A seeder cart attachment to an agricultural implement in which a seeder cart has rear castor wheels and a forward draft member adapted to be engaged on traction means and supports at least a bin for seed and/or fertiliser and means to discharge the seed and/or fertiliser to the said agricultural implement, characterised by a pull head connected to the said draft member by universal pivot means whereby the pull head can swivel on the said draft member but has pull on the draft member transmitted thereto, and withdrawable pins on the said pull head adapted to engage draft bars projecting forwardly from the said agricultural implement whereby to pull the said agricultural implement from the said pull head, further characterised by limited telescopic stabilizer bars connected between a rearward portion of the said cart and the said draft bars, said stabilizer bars and said universal pivot means being adapted to allow limited universal movement of the said cart in relation to the said agricultural implement while maintaining the said cart between the said draft bars in a general axial alignment.

2. A seeder cart attachment to an agricultural implement in which a seeder cart has rear castor wheels and a forward draft member adapted to be engaged on traction means and supports at least a bin for seed and/or fertiliser and means to discharge the seed and/or fertiliser to the said agricultural implement, characterised by
   (a) a pull head adapted to be connected to the said draft member,
   (b) a central connecting pin on the said pull head,
   (c) a pair of coupling pins on the said pull head spaced from the said central pin with one pin on each side to engage the forward ends of draft bars projecting forwardly from the said agricultural implement and at least one being withdrawable to release the draft bar engaged by it, (d) universal pivot means on the said pull head engaging the said central connecting pin to couple the said pull head to the said draft bars, and (e) limited telescopic stabilizer bars connected between the draft bars and the rearward portion of the seeder cart to limit movement of the said seeder cart between the said draft bars.

3. A seeder cart attachment according to claim 1 or 2, characterised in that the said pull head comprises upper and lower frame members joined by spacers and apertured at end portions to receive coupling pins, intermediate apertures through the said upper and lower frame members to receive a connecting pin, hollow spacers coaxial with the intermediate apertures projecting inwardly from the said upper and lower frame members, said universal pivot means being adapted to engage on the said connecting pin to be confined between the said hollow spacers.

4. A seeder cart attachment according to claim 2 characterised in that the said universal pivot means comprise a ball pivot having one part adapted to be engaged on the said central connecting pin and a complementary second part formed on the said draft member.

5. A seeder cart according to claim 1 or 2 characterised in that the said stabilizer bars are connected to the rear portion of the frame of the said cart and project rearwardly at an angle and are adapted to be hingedly connected to the said draft bars.

6. A seeder cart according to claim 1 or 2 characterised by a pair of pull stabilizers adapted to have their forward ends connected to a forward part of the said draft bars and project angularly rearwardly to cross and to have their rear ends connected to the said draft bars to stabilize the said draft bars when the coupling pins are withdrawn to release the said pull head from the said draft bars, whereby to allow the said agricultural implement to be towed independently of the cart.

7. A seeder unit according to claim 1 or 2 in combination with a tillage implement having a central wheeled main frame having hinged thereto forwardly projecting draft bars releasably engaging the said pull head.

8. A seeder cart according to claim 1 or 2 in combination with a tillage implement having a central main wheeled frame and a pair of wheeled side frames articulated thereto, characterised by draft bars hingedly connected to the said main frame and extending forwardly to releasably engage the said pull head, and secondary draft members connected between the said side frames remote from their articulation to the said main frame and the forward ends of the said draft bars.

* * * * *